US012580287B2

(12) United States Patent
Takahashi

(10) Patent No.: US 12,580,287 B2
(45) Date of Patent: Mar. 17, 2026

(54) HIGH-FREQUENCY COAXIAL INPUT COUPLER INCLUDING A TRANSMISSION WINDOW THAT COUPLES A WAVEGUIDE TO AN ACCELERATION CAVITY

(71) Applicant: CANON ELECTRON TUBES & DEVICES CO., LTD., Otawara (JP)

(72) Inventor: Hideharu Takahashi, Edogawa (JP)

(73) Assignee: CANON ELECTRON TUBES & DEVICES CO., LTD., Ottawara (JP)

( * ) Notice: Subject to any disclaimer, the term of this patent is extended or adjusted under 35 U.S.C. 154(b) by 223 days.

(21) Appl. No.: 18/462,944

(22) Filed: Sep. 7, 2023

(65) Prior Publication Data

US 2023/0420821 A1 Dec. 28, 2023

Related U.S. Application Data

(63) Continuation of application No. PCT/JP2021/026832, filed on Jul. 16, 2021.

(30) Foreign Application Priority Data

Mar. 10, 2021 (JP) ................................ 2021-038500

(51) Int. Cl.
*H01P 1/08* (2006.01)
*H01J 23/44* (2006.01)
(Continued)

(52) U.S. Cl.
CPC ................ *H01P 1/08* (2013.01); *H01J 23/44* (2013.01); *H01J 23/48* (2013.01); *H01P 3/127* (2013.01); *H01P 5/103* (2013.01); *H05H 7/22* (2013.01)

(58) Field of Classification Search
CPC ............. H01P 1/08; H01J 23/44; H01J 23/48
(Continued)

(56) References Cited

U.S. PATENT DOCUMENTS 3,207,943 A * 9/1965 Staprans ................. H01J 19/74 315/5.43
2008/0024251 A1 1/2008 Soga et al.
(Continued)

FOREIGN PATENT DOCUMENTS

JP 2-32208 U 2/1990
JP 2008-28905 A 2/2008
(Continued)

OTHER PUBLICATIONS

International Search Report issued Oct. 12, 2021 in PCT/JP2021/026832 filed on Jul. 16, 2021, 2 pages.
(Continued)

*Primary Examiner* — Benny T Lee
(74) *Attorney, Agent, or Firm* — Oblon, McClelland, Maier & Neustadt, L.L.P.

(57) ABSTRACT

According to one embodiment, an high-frequency input coupler installed between a waveguide and an acceleration cavity to input high-frequency waves from the waveguide to the acceleration cavity, a coaxial waveguide conversion unit includes a high-frequency transmission window structure connection unit that connects the high-frequency transmission window structure and an inner conductor connection unit that connects an inner conductor which includes an inner conductor support on a side of the inner conductor connection unit, and the high-frequency input coupler includes an electrically connectable and deformable buffer between the inner conductor support and the inner conductor connection unit.

4 Claims, 3 Drawing Sheets

(51) Int. Cl.
*H01J 23/48* (2006.01)
*H01P 3/127* (2006.01)
*H01P 5/103* (2006.01)
*H05H 7/22* (2006.01)

(58) Field of Classification Search
USPC .......................................................... 333/252
See application file for complete search history.

(56) References Cited

U.S. PATENT DOCUMENTS

| | | | |
|---|---|---|---|
| 2008/0246553 | A1 | 10/2008 | Okamoto |
| 2020/0127355 | A1 | 4/2020 | Higa |

FOREIGN PATENT DOCUMENTS

| | | | |
|---|---|---|---|
| JP | 2008-259109 | A | 10/2008 |
| JP | 2017-21977 | A | 1/2017 |
| JP | 2018-113503 | A | 7/2018 |

OTHER PUBLICATIONS

Extended European Search Report issued Feb. 19, 2025 in European Patent Application No. 21930255.1, 9 pages.

* cited by examiner

HIGH-FREQUENCY COAXIAL INPUT COUPLER INCLUDING A TRANSMISSION WINDOW THAT COUPLES A WAVEGUIDE TO AN ACCELERATION CAVITY

CROSS-REFERENCE TO RELATED APPLICATIONS

This application is a Continuation Application of PCT Application No. PCT/JP2021/026832, filed Jul. 16, 2021 and based upon and claiming the benefit of priority from Japanese Patent Application No. 2021-038500, filed Mar. 10, 2021, the entire contents of all of which are incorporated herein by reference.

FIELD

Embodiments described herein relate generally to a high-frequency input coupler and a waveguide.

BACKGROUND

High-frequency input couplers are used in charged particle (electron, ion, proton) accelerators to inject high-frequency waves (microwaves) emitted from a high-frequency wave amplifier such as a klystron into an acceleration cavity.

When injecting high-frequency waves (microwaves) into an acceleration cavity, a high-frequency wave input coupling instrument (coupler) having a structure that can provide good coupling to the acceleration cavity is required. The high-frequency wave input coupler is mainly constituted by a high-frequency wave transmission window structure including a high-frequency wave transmission window, an outer conductor, and an inner conductor (antenna), and the outer conductor and the inner conductor form a coaxial structure. The high-frequency transmission window structure and the inner conductor are connected to a waveguide via a coaxial waveguide converting portion.

Waveguides are assembled mainly by welding, but the heat applied by welding tends to cause distortion. Welding distortion can be removed by carrying out a heat treatment after welding, but in many cases, the distortion is not removed completely and remains. In particular, when the distortion is large, the inner conductor may not be connected to the waveguide.

The present embodiment has been achieved in consideration of the above-described points, and an object thereof to provide a high-frequency input coupler and a waveguide, that can connect the inner conductor even if there is distortion in the waveguide.

DETAILED DESCRIPTION OF THE INVENTION

Figure 1:
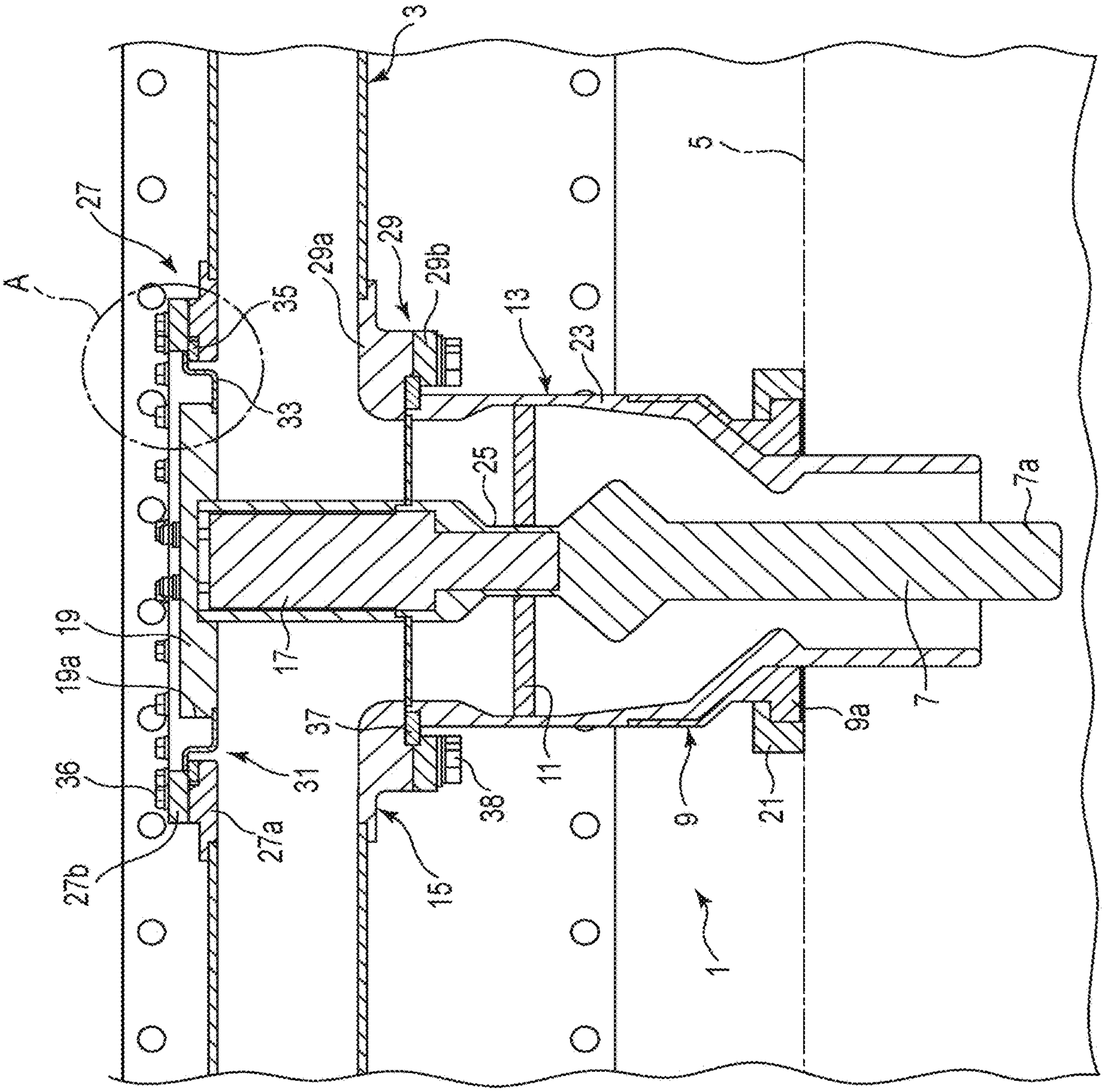
FIG. 1 is a longitudinal sectional view of a high-frequency wave input coupler provided between an acceleration cavity and a waveguide.

In general, according to one embodiment, a high-frequency input coupler installed between a waveguide and an acceleration cavity to input high-frequency waves from the waveguide to the acceleration cavity, the coupler comprising: an inner conductor, an outer conductor provided around an outer circumference of the inner conductor, a high-frequency transmission window structure including a high-frequency transmission window and a coaxial waveguide conversion unit connected to the waveguide, wherein the coaxial waveguide conversion unit includes a high-frequency transmission window structure connection unit that connects the high-frequency transmission window structure and an inner conductor connection unit that connects the inner conductor, the inner conductor includes an inner conductor support on a side of the inner conductor connection unit, the inner conductor connection unit includes a space in which the inner conductor support is placed, and the high-frequency input coupler comprises an electrically connectable and deformable buffer between the inner conductor support and the inner conductor connection unit.

One embodiment will be described in detail below with reference to the drawings. Note that in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

Figure 2:
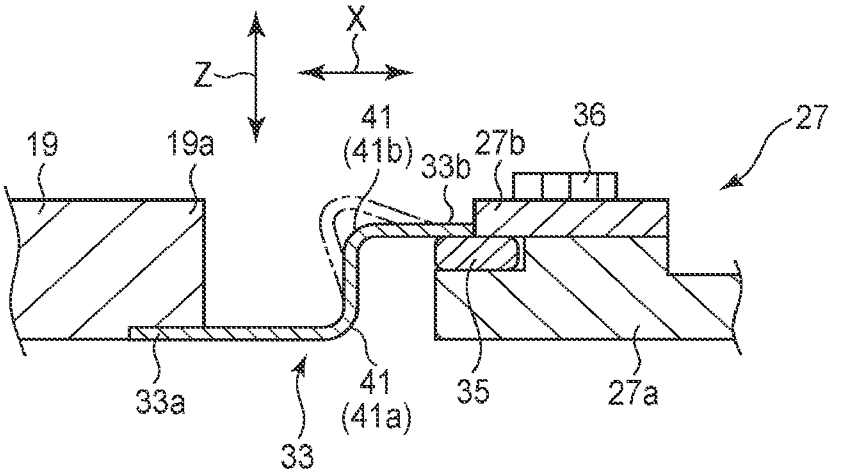
FIG. 2 is an enlarged view showing a part A extracted from FIG. 1.

With reference to FIGS. 1 and 2, the first embodiment will be explained.

As shown in FIG. 1, a high-frequency input coupler 1 of the first embodiment is installed between a waveguide 3 and an acceleration cavity 5 to input high-frequency waves from the waveguide 3 to the acceleration cavity 5.

The high-frequency input coupler 1 comprises an inner conductor 7, an outer conductor 9 provided on an outer circumference of the inner conductor 7, a high-frequency transmission window structure 13 including a high-frequency transmission window 11 and a coaxial waveguide conversion unit 15 connected to the waveguide 3.

The waveguide 3 is assembled mainly by welding. The waveguide 3 and the coaxial waveguide converter 15 are connected to each other by welding.

The inner conductor 7 is provided to penetrate the high-frequency transmission window structure 13, and an inner conductor holder 17 is provided inside on a side of a coaxial waveguide conversion unit 15, and an inner conductor support 19 is fixed to an end portion (one end) on the side of the coaxial waveguide conversion unit 15. Further, the other end portion of the inner conductor 7 includes an antenna portion **7*a* arranged to protrude into the acceleration cavity 5**.

The inner conductor support 19 has a disk shape.

The outer conductor 9 is provided coaxially with the inner conductor 7 and an end portion **9*a* on a side of an acceleration cavity 5 is connected to the acceleration cavity 5 via a vacuum-side flange 21, and an inner circumferential side thereof is fixed to an outer sleeve 23 (to be described later) of the high-frequency wave transmission window structure 13. The inner conductor 7, the vacuum-side flange 21 and the outer conductor 9 are assembled by brazing, welding or the like after the high-frequency wave transmission window structure 13** to be described later) is assembled by brazing.

The high-frequency transmission window structure 13 comprises a high-frequency transmission window 11 that is airtight and transmits high-frequency waves, and an outer sleeve 23 and an inner sleeve 25, which constitute a transmission path. The high-frequency transmission window 11 is formed into an annular shape, and the inner sleeve 25 is inserted into the annular portion to partition a vacuum side and an atmosphere side between the inner sleeve 25 and the outer sleeve 23. For the high-frequency transmission window 11, for example, a ceramic material such as alumina is used. The outer sleeve 23 and the inner sleeve 25 are joined to the high-frequency transmission window 11 by brazing.

The outer sleeve 23 and the inner sleeve 25 are made of copper.

The inner sleeve 25 is continuous with the inner conductor 7, and in this embodiment, the inner sleeve 25 and the inner conductor 7 are made of the same material.

The coaxial waveguide conversion unit 15 comprises an inner conductor connection unit 27 and a high-frequency transmission window structure connection unit 29. The inner conductor connection 27 and the high-frequency transmission window structure connection unit 29 are provided to oppose each other.

The inner conductor support 19 described above is connected to the inner conductor connection unit 27 via a buffer 33.

The connection between the inner conductor connection unit 27 and the inner conductor support 19 will now be explained.

The inner conductor connection unit 27 comprises a fastened portion 27*a* formed into an annular shape in which an inner space 31 is formed, and a fastening member 27*b* which is fastened and fixed to the fastened portion 27*a*.

In the circular inner space 31 of the fastened portion 27*a*, the disk-shaped inner conductor support 19 described above is disposed.

The buffer 33 has an annular shape, and an inner circumferential edge portion 33*a* (FIG. 2) is fixed to an outer circumferential edge portion 19*a* of the inner conductor support 19 by welding or brazing. The outer circumferential edge portion 33*b* (FIG. 2) of the buffer 33 is fixed to an inner conductor connection unit-side flange 35, and the inner conductor connection unit-side flange 35 is interposed between the fastened portion 27*a* and the fastening member 27*b* of the inner conductor connection unit 27, and the fastened portion 27*a* and the fastening member 27*b* are fixed with bolts 36.

The buffer 33 is an electrically connectable and deformable annular member and is, for example, a copper plate having a thickness of 0.8 mm.

The inner conductor connection-side flange 35 is a ring-shaped metal member.

The assembling of the high-frequency input coupler 1 will now be described.

As shown in the FIG. 1, the inner conductor 7 and the high-frequency transmission window structure 13 are assembled together, the inner conductor support 19 is fixed to the inner conductor holder 17 of the inner conductor 7, the inner circumferential edge portion 33*a* of the buffer 33 is brazed or welded to the outer circumferential edge portion 19*a* of the inner conductor support 19, and the outer circumferential edge portion 33*b* of the buffer 33 is brazed or welded to the inner connection unit-side flange 35.

On the other side, as shown in FIG. 1, the waveguide 3 is fixed to the coaxial waveguide conversion unit 15 by welding or brazing.

Then, the inner conductor support 19 is placed in the inner space 31 of the inner conductor connection unit 27, and the inner conductor connection unit-side flange 35 to which the buffer 33 is attached is interposed between the fastening part 27*a* and the fastening member 27*b*, and then fixed with the bolts 36.

As shown in FIG. 1, the high-frequency transmission window structure connection unit 29, the vacuum-side flange 37 brazed to the outer sleeve 23 of the high-frequency transmission window structure 13 is interposed between the fastened portion 29*a* and the fastening member 29*b* of the high-frequency transmission window structure connection unit 29, and the fastened portion 29*a* and the fastening member 29*b* are fixed with bolts 38.

The operational effects of this embodiment will be described.

The buffer 33, which is electrically connectable and deformable, is provided between the inner conductor support 19 and the inner conductor connection unit 27 of the coaxial waveguide conversion part 15. With this structure, even in the case where distortion due to heat caused by welding or brazing remains in the waveguide 3 and the coaxial waveguide conversion unit 15, the buffer 33 is deformed in response to distortion and the inner conductor support 19 and the inner conductor connection portion 27 can be easily connected.

For example, as shown in FIG. 2, the buffer 33 provided between the inner conductor support 19 and the inner conductor connection unit 27 is deformable to movement or displacement along up-and-down directions Z and along a circumferential direction X, and by deforming as shown by a double-dashed line, it can absorb displacement between the inner conductor support 19 and the inner conductor connection unit 27.

Further, even if the inner conductor support 19 is not inclined but the axis of the inner conductor 7 FIG. 1 is displaced, the axial displacement of the inner conductor 7 can be absorbed by deforming the buffer 33.

Further, in this embodiment, the buffer 33 includes a bend portion 41 between the inner circumferential edge portion 33*a* and the outer circumferential edge portion 33*b*, and therefore the bend portion 41 promotes deformation and makes deformation easier.

Further, two bend portions 41*a* and 41*b* may be provided along a radial direction. With this configuration, deformation between the two bend portions 41*a* and 41*b* easily occur.

By arranging the two bend portions 41*a* and 41*b* to bend in directions different from each other, the two bend portions 41*a* and 41*b* can be easily deformed in the direction of narrowing the bending as well as in the direction of widening the bending.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Figure 3:
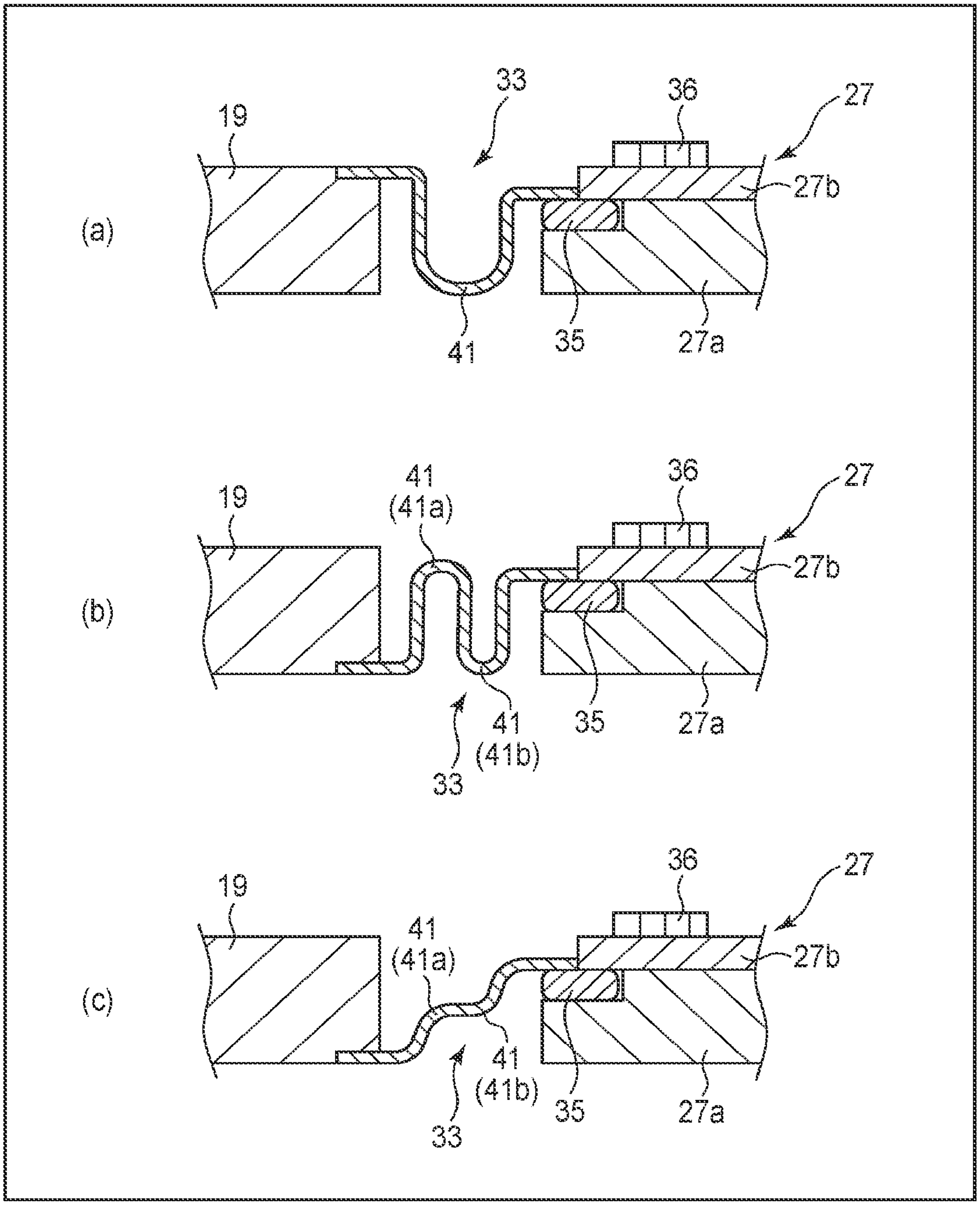
FIG. 3 is a longitudinal sectional view corresponding to FIG. 2, showing modified examples of a buffer in sections (a) to (c).

For example, the shape of the buffer 33 is not limited to the above-described shape, but it may as well be, such as shown in FIG. 3, part (a), that the bend portion 41 forms an approximately U-shape, or such as shown in FIG. 3, part (b), that two bend portions 41*a* and 41*b* are formed into two U-shapes in different directions, or such as shown in FIG. 3, part (c), that two bend portions 41*a* and 41*b* are formed in a stepped manner in the radial direction.

What is claimed is:

1. A high-frequency input coupler installed between a waveguide and an acceleration cavity to input high-frequency waves from the waveguide to the acceleration cavity, the coupler comprising:

an inner conductor, an outer conductor provided around an outer circumference of the inner conductor, and a high-frequency transmission window structure including a high-frequency transmission window and a coaxial waveguide conversion unit connected to the waveguide, wherein the coaxial waveguide conversion unit includes a high-frequency transmission window structure connection unit that connects the high-frequency transmission window structure and an inner conductor connection unit that connects the inner conductor, the inner conductor includes an inner conductor support on a side of the inner conductor connection unit, the inner conductor connection unit includes a space in which the inner conductor support is placed, the high-frequency input coupler comprises an electrically connectable and deformable buffer between the inner conductor support and the inner conductor connection unit, and wherein the buffer has an annular shape formed along an outer circumferential edge of the inner conductor support and includes a bend portion between an inner circumferential edge portion fixed to the inner conductor support and an outer circumferential edge portion fixed to the inner conductor connection unit.

2. A waveguiding apparatus, comprising:

the high-frequency input coupler of claim 1; and the waveguide.

3. The high-frequency input coupler of claim 1, wherein two bend portions each identical to the bend portion are provided in a radial direction.

4. The high-frequency input coupler of claim 3, wherein the two bend portions are bent in directions different from each other.

* * * * *